United States Patent [19]

Willemin

[11] 4,314,781

[45] Feb. 9, 1982

[54] COPYING MACHINE WITH AN OPTIC READING DEVICE

[75] Inventor: Paul Willemin, Bassecourt, Switzerland

[73] Assignee: Willemin Machines S.A., Bassecourt, Switzerland

[21] Appl. No.: 8,240

[22] Filed: Feb. 1, 1979

[30] Foreign Application Priority Data

Feb. 6, 1978 [CH] Switzerland ............... 1269/78

[51] Int. Cl.³ ............... B23Q 35/10; B23Q 35/128; B23Q 35/40
[52] U.S. Cl. .................. 409/96; 409/104; 409/118; 409/128
[58] Field of Search ............... 409/96, 104, 115, 118, 409/119, 128

[56] References Cited

U.S. PATENT DOCUMENTS

| | | | |
|---|---|---|---|
| 2,336,376 | 12/1943 | Tandler et al. | 409/96 |
| 2,895,386 | 7/1959 | Mann | 409/118 |
| 3,528,337 | 9/1970 | Dulebohn | 409/128 X |
| 3,598,018 | 8/1971 | Varga | 409/96 X |
| 3,886,847 | 6/1975 | Kuhlmann | 409/115 X |

Primary Examiner—Z. R. Bilinsky
Attorney, Agent, or Firm—Silverman, Cass & Singer, Ltd.

[57] ABSTRACT

Copying machine with optical reading device comprising three optical reading heads the respective luminous beams of which follow three curves moving in synchronism and which control the displacements in directions which are different from each other of a working unit, each reading head controlling the displacements of the said unit in a proper direction.

3 Claims, 7 Drawing Figures

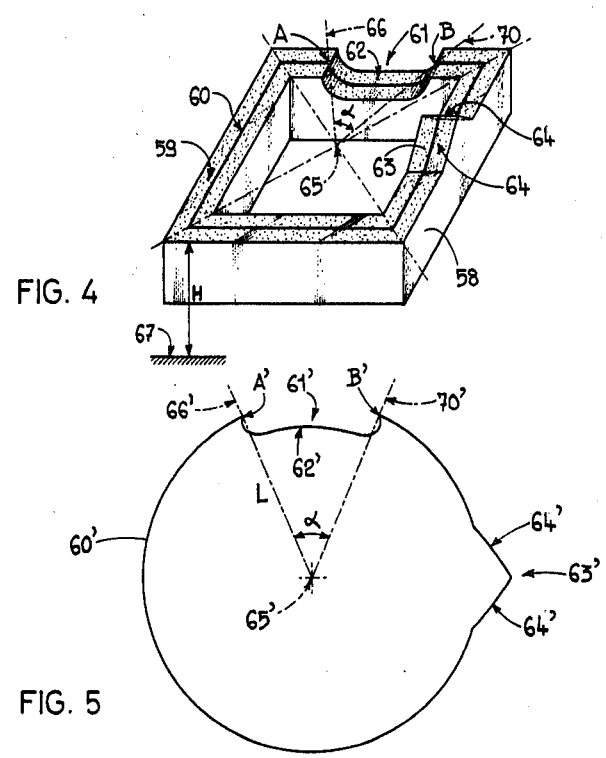
FIG. 4
FIG. 5
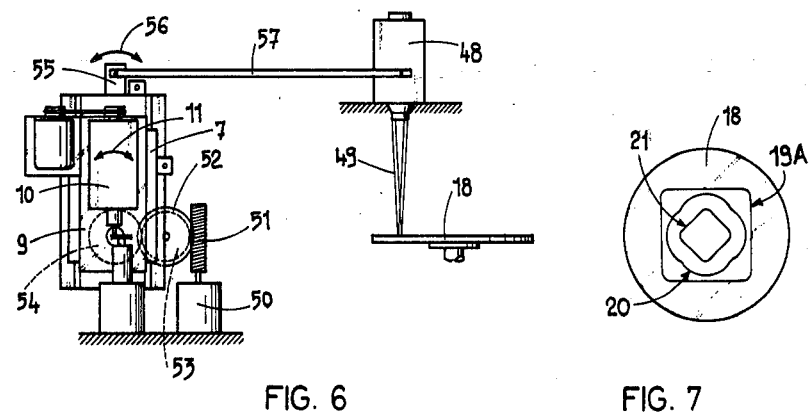
FIG. 6
FIG. 7

COPYING MACHINE WITH AN OPTIC READING DEVICE

The present invention relates to a copying machine with an optical reading device.

This machine is characterized by the fact that it comprises at least two optical reading heads cooperating simultaneously with two curves moving in synchronism. The reading heads are both connected to at least one of the—support of a workpiece and the support of a working tool in such a way that the displacements the reading heads effect for following each of the lines of the curves is converted into displacements, in several directions, of the workpiece or the worktool.

The drawing shows, by way of example, one embodiment of the object of the invention.

FIG. 4 is a perspective view of an example of workpiece which can be worked by the present machine.

FIG. 5 is a curve which is representative of the relief of the said workpiece.

FIG. 6 is a diagrammatic elevational view of a part of the machine, and

FIG. 7 is a plan view of a detail.

Figure 1:
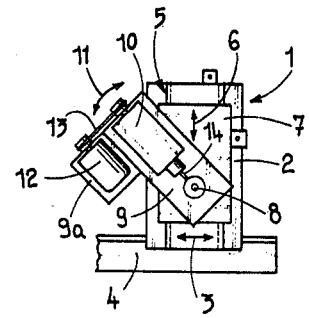
FIG. 1 is an elevational view of a detail of a copying machine having an optical reading device.

The copying machine with an optical reading device as represented comprises a working unit, generally designated by the reference character 1, represented in detail in FIG. 1. The frame of this working unit comprises a plate shaped slider 2, moving according to the direction of arrow 3, along a horizontal slideway 4. The slider or member 2 is provided with a vertical slide-way 5 on which moves, in the direction of the arrow 6 which is perpendicular to the direction of the arrow 3, a slider or member 7. On slider 7 there is articulated at 8 a support or element 9 of a quill 10, this support being able to oscillate or rotate in the direction of arrow 11. The support 9 is provided with a prolongation 9a carrying a motor 12 driving, by means of a belt 13, the spindle of the quill 10 which carries at its opposite end, a working tool 14.

Figure 2:
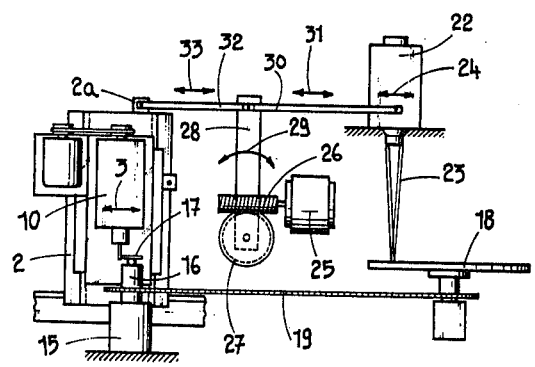
FIGS. 2 and 3 are elevational diagrammatical views of two parts of this machine.
Figure 3:
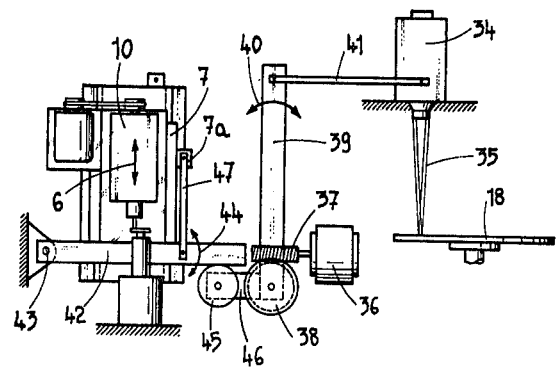

The machine, which is diagrammatically represented in FIGS. 2 and 3, comprises a motor 15 driving a spindle 16 carrying the workpiece 17, which rotates opposite the tool 14. The machine comprises a rotatable plate 18 connected by a chain 19 to the spindle 16, so that the plate 18 rotates in synchronism with the spindle 16 and at the same speed. This plate 18 is intended to receive a drawing such as is represented in FIG. 7, comprising three curves 19A, 20 and 21 corresponding to different working operations of the member 17, for instance its outline, the relief of its upper face and, may be, the inclination of some parts of the said upper face.

The machine comprises a first optical reading head 22 the luminous beam 23 of which (FIG. 2) is directed for instance onto the curve 19A. This optical head 22 is mounted on the frame of the machine so as to be able to move horizontally according to the direction of arrow 24 of FIG. 2. Its displacements are controlled by a motor 25 driving, by means of an endless screw 26, an endless screw-wheel 27 rigidly connected with a lever 28 oscillating in the direction of the arrow 29. A link 30, moving in the direction of the arrow 31, connects the end of the oscillating lever 28 with the reading head 22.

An electronic control device which will not be disclosed here in detail since such devices are of general use in the copying machines with optical reading devices (see for instance the reading head of the firm SICK A.G., Optik and Elektronik, in Waldkirch (Germany)) has the effect that, driven by the motor 25 the reading head 22 moves itself transverse with respect to the line of the curve 19A, as the plate 18 rotates, so that the luminous beam 23 is always perfectly centered on the line of curve 19A.

The displacements of the reading head 22 serve as information for producing the displacements in the direction of the arrow 3 of FIG. 1, of the supporting plate 2. To this effect, this plate is rigidly connected with an ear 2a on which there is articulated a link 32 which is on the other hand articulated at the end of the oscillating lever 28, this link moving in the sense of the arrow 33 during oscillating movements of the lever 28. It results from this arrangement that the tool 14 works the periphery of the workpiece 17 so that the periphery of workpiece 17 conforms to the curve 19A.

It is to be noted that one can provide a connecting device with demultiplication between the reading head 22 and the plate 2 of the support of the quill 10, so that the curve 19A can be at a scale greater than a 1:1 scale, that will increase the precision of the working of workpiece 17.

The machine comprises a second reading head 34 (FIG. 3) the luminous beam 35 of which is directed onto the curve 20. Beam 35 follows curve 20 during the rotation of the plate 18 owing to a motor 36 driving, through the intermediary of a worm and segment device 37–38, a lever 39 oscillating in a direction shown by arrow 40. This lever 39 is connected by a link 41 to the reading head 34.

The connection between the reading head 34 and the quill 10 is ensured by an oscillating lever 42 articulated at 43 on a stationary point of the frame of the machine and which lever 42 is driven in its displacements in the direction of arrow 44, by a roller 45 carried by a lever 46 rigidly connected with the wheel 38. The lever 42 is connected by a link 47 to an ear 7a of the slider 7 to produce, with demultiplication the vertical displacements of the quill 10 in the direction of the arrow 6, thus determining the relief of the workpiece 17.

Thus, in the case of a workpiece 58 represented in FIG. 4, constituted by a rectangular frame, it is the relief of the upper face 59 of this member which will be determined by the vertical displacements of the quill 10 in the direction of the arrow 6 of FIG. 1. It has to be stated, however, that this example is purely theoretical, the cutting tool having been assimilated to a point which would follow a line 60 traced on the face 59 of the workpiece 58.

In this example, the upper face 59 of the workpiece 58 is provided with a recess 61 the bottom 62 of which is planar, and with a protrusion 63 limited by two inclined planes 64.

The relief of the workpiece 58 is expressed by the curve 60' of FIG. 5 and is obtained as follows:

From a point 65, for instance the center of the rectangle constituted by the workpiece 58, one traces a straight line 66 cutting the line 60, for instance at the point A of the line situated at one of the ends of the recess 61. One traces, to realize the curve 60', a straight line 66' on which one reports or scribes a length L equal or proportional to the height H of the point A with respect to a reference level 67. One of the ends of the portion of the straight line 66' thus delimited will constitute a center 65' corresponding to the center 65 of the workpiece 58, and the other end a point A' corresponding to point A of the line 60.

At any angular displacement of the straight line 60 there corresponds an equal angular displacement of the straight line 66'. Thus, for points A and B of the line 60 separated by an angle α, there corresponds the points A' and B' of the curve 60' also separated by the angle α.

It results from the preceding that the areas of the surface 59 which are planar that is to say where the height H is constant, constitute circular portions of the curve 60' where the length L is constant. So far as the recess 61 of the surface 59 is concerned, this recess corresponds to a depression 61' of the curve 60', the part 62' of which is an arc of a circle, and which corresponds to the bottom plane portion 62 of the recess 61. The protrusion 63 of the workpiece 58 corresponds to an embossment 63' of the curve 60', the two faces 64' of which are an arc of a circle, and represent the two planes 64 of the protrusion 63.

The machine comprises a third reading head, 48, the luminous beam 49 of which is directed towards the drawing 21. The lateral displacements of the reading head 48, which follow the line of the curve 21, are produced by a motor 50 through the intermediary of a worm and segment device 51-52 driving a wheel 53 meshing with a wheel 54 rigidly connected with the plate 9 carrying the quill 10 and coaxial with the axis of articulation 8 (FIG. 1) of the plate 9 on the slider 7. The plate 9 is also rigidly connected with a lever 55 oscillating according to the direction of the arrow 56 and which is connected by a link 57 to the reading head 48. The lateral displacements of this head are converted this way into or rotational movements, according to the direction of the arrow 11, of the quill 10.

The machine having not been represented in its whole, it is to be mentioned that the architecture of the machine will be such that the three reading heads will all be arranged above the plate 18, for instance at angles of 120° one with respect to each other with suitable mechanical connections which may be more complicated than these disclosed and represented, connecting the reading beads to the quill so that each of them drives the displacements of the quill in a proper direction.

As a modification, one may provide the case where the curves would not be mounted on one and same plate, but on different plates rotating in synchronism.

As a modification also, the reading heads could control the displacements of the spindle carrying the workpiece and not the displacements of the quill, or still, both of these elements at the same time.

What I claim is:

1. A copying machine including a frame, a movable workpiece support and a worktool, the worktool being mounted on a worktool support which is movable on the frame of the machine in at least three different directions relative to the workpiece support, the machine comprising:
   at least three separate, continuous and planar line curves moving in synchronism with one another and the workpiece support;
   at least three optical reading heads, each head cooperating with one of the curves simultaneously with the other heads and each head including means for displacing the head to follow the line of its associated curve;
   first connection means between the worktool support and a first one of the reading heads for moving the worktool support in a first direction of the three directions of movement in response to displacement of the first reading head;
   second connection means between the worktool support and a second one of the reading heads for moving the worktool support in a second direction of the three directions of movement in response to displacement of the second reading head; and
   third connection means between the worktool support and a third one of the reading heads for rotating the worktool support in a third direction of the three directions of movement in response to displacement of the third reading head;
   so that displacements of the optical reading heads effected by their following the lines of the curves move the worktool support in all of the three different directions of movement with each line curve serving to control movement of the worktool support in one direction the worktool support including a first member linearly slidable along said first direction, a second member linearly slidable on the first member along said second direction, the first and second direction being perpendicular to one another, and an element articulated around an axis on the second member in said third direction, and further including a quill having an axis and being mounted on the element with the axis of the quill perpendicular to the axis on the second member so that the quill may rotate in said third direction around the axis of the second member and may linearly move in the first two directions.

2. The copying machine as claimed in claim 1 in which the workpiece support is rotating, and further including a plate which is rotatable and connected to the workpiece support for rotating in synchronism with the workpiece support, the curves being mounted on the plate so that the curves pass simultaneously opposite their respective reading heads.

3. The copying machine as claimed in claim 1 in which the first, second and third connection means are separate from one another.

* * * * *